US 10,432,058 B2

(12) United States Patent
Berkouk et al.

(10) Patent No.: US 10,432,058 B2
(45) Date of Patent: Oct. 1, 2019

(54) DEVICE FOR THE VIBRATION-DECOUPLED MOUNTING OF A MOTOR

(71) Applicant: Brose Fahrzeugteile GmbH & Co. Kommanditgesellschaft, Wuerzburg, Wuerzburg (DE)

(72) Inventors: Maurad Berkouk, Le Conquet (FR); Sebastien Labat, Schwanfeld (DE); Johannes Helmich, Ilsfeld (DE); Peter Pieczkowski, Margetshoechheim (DE)

(73) Assignee: Brose Fahrzeugtelle GmbH & Co. Kommanditgesellschaft, Wuerzburg, Wurzburg (DE)

( * ) Notice: Subject to any disclaimer, the term of this patent is extended or adjusted under 35 U.S.C. 154(b) by 60 days.

(21) Appl. No.: 15/390,986

(22) Filed: Dec. 27, 2016

(65) Prior Publication Data

US 2017/0110932 A1    Apr. 20, 2017

Related U.S. Application Data

(63) Continuation of application No. PCT/EP2015/064574, filed on Jun. 26, 2015.

(30) Foreign Application Priority Data

Jun. 27, 2014    (DE) .................. 20 2014 005 163 U (51) Int. Cl.
*H02K 5/24* (2006.01)
*F04D 29/66* (2006.01)
*H02K 5/26* (2006.01)

(52) U.S. Cl.
CPC ............. *H02K 5/24* (2013.01); *F04D 29/668* (2013.01); *H02K 5/26* (2013.01)

(58) Field of Classification Search
CPC .......... H02K 5/24; H02K 5/26; F04D 29/668; F04D 29/66; F04D 29/663; F01D 25/04;
(Continued)

(56) References Cited

U.S. PATENT DOCUMENTS 6,098,948 A * 8/2000 Boucheret ................ H02K 5/24
248/603
6,987,336 B2 1/2006 Streng et al.
(Continued)

FOREIGN PATENT DOCUMENTS

CN    1 531 168 A    9/2004
CN    201435644 Y    3/2010
(Continued)

OTHER PUBLICATIONS

FR 1521494 A (English Translation).*
(Continued)

*Primary Examiner* — Julio C. Gonzalez
*Assistant Examiner* — Alexander Moraza
(74) *Attorney, Agent, or Firm* — Muncy, Geissler, Olds & Lowe, P.C.

(57) ABSTRACT

A device for mounting an electric motor, in particular a fan drive of a heating or an air conditioning system in a motor vehicle, in such a way that vibrations are decoupled, the device having a number of damping and/or decoupling elements at the motor end, each damping or decoupling element being supported eccentrically in relation to the electric motor or the stator thereof or pole casing or motor housing thereof. A drive and to a damping and/or decoupling element is also provided.

16 Claims, 9 Drawing Sheets

(58) Field of Classification Search
CPC .. F01D 25/164; F01D 5/10; F01D 5/26; F16F 1/30; F16F 15/00; F16F 15/04; F16F 15/08
USPC ........ 310/51, 91, 89; 415/119, 213.1, 214.1; 416/190, 500; 417/363, 423.14; 248/560, 603, 634, 638
See application file for complete search history.

(56) References Cited

U.S. PATENT DOCUMENTS

| | | | | |
|---|---|---|---|---|
| 7,566,998 | B2 * | 7/2009 | Winkler | .................. H02K 5/24 310/51 |
| 2004/0104628 | A1 * | 6/2004 | Streng | .................. F04D 29/668 310/51 |
| 2006/0125330 | A1 * | 6/2006 | Winkler | .................. H02K 5/24 310/51 |
| 2009/0152963 | A1 | 6/2009 | Winkler et al. | |
| 2013/0052874 | A1 * | 2/2013 | Fleischmann | ........... F04D 25/08 439/625 |
| 2013/0328421 | A1 | 12/2013 | Barkic et al. | |

FOREIGN PATENT DOCUMENTS

| | | | | |
|---|---|---|---|---|
| CN | 202353368 | U | 7/2012 | |
| DE | 4306588 | A1 * | 1/1994 | ........... F04D 29/668 |
| DE | 93 03 162 | U1 | 6/1994 | |
| DE | 197 30 810 | A1 | 2/1998 | |
| DE | 199 42 953 | A1 | 3/2000 | |
| DE | 19942953 | A1 * | 3/2000 | ........... F04D 25/082 |
| DE | 100 54 556 | A1 | 5/2002 | |
| DE | 10 2010 041 177 | A1 | 3/2012 | |
| EP | 0718957 | A1 * | 6/1996 | ............. B08B 3/028 |
| EP | 1404008 | A2 | 3/2004 | |
| EP | 1 636 892 | B1 | 8/2007 | |
| EP | 2515418 | A2 * | 10/2012 | ............. F04D 25/08 |
| FR | 1521494 | A * | 4/1968 | ............. F16F 15/08 |
| FR | 1521494 | A | 4/1968 | |
| FR | 2 693 779 | A3 | 1/1994 | |
| FR | 2 723 492 | A1 | 2/1996 | |
| FR | 2752108 | B1 * | 1/2004 | ............... H02K 5/24 |
| JP | 2001-054253 | A | 2/2001 | |
| WO | WO-2012034687 | A1 * | 3/2012 | ......... F04D 25/0613 |
| WO | WO 2012034687 | A1 * | 3/2012 | ......... F04D 25/0613 |
| WO | WO-2012038132 | A1 * | 3/2012 | ........... F04D 27/008 |
| WO | WO 2013/127454 | A1 | 9/2013 | |

OTHER PUBLICATIONS

FR 2752108 B1 (English Translation).*
DE 4306588 A1 (English Translation).*
EP 2515418 A2 (English Translation).*
WO 2012034687 A1 (English Translation).*
DE-19942953-A1 (English Translation) (Year: 2000).*
WO-2012038132-A1 (English Translation) (Year: 2012).*
EP-0718957-A1 (English Translation) (Year: 1996).*
WO-2012034687-A1 (English Translation) (Year: 2012).*
Chinese First Office Action issued by Chinese Patent Office dated Jul. 10, 2018 in corresponding application 201580034641.1.
Second Chinese Office Action dated Dec. 28, 2018 in corresponding application 201580034641.1.

* cited by examiner

DEVICE FOR THE VIBRATION-DECOUPLED MOUNTING OF A MOTOR

This nonprovisional application is a continuation of International Application No. PCT/EP2015/064574, which was filed on Jun. 26, 2015, and which claims priority to German Patent Application No. 20 2014 005 163.1, which was filed in Germany on Jun. 27, 2014, and which are both herein incorporated by reference.

BACKGROUND OF THE INVENTION

Field of the Invention

The invention relates to a device for the vibration-decoupled mounting of an electric motor, in particular a fan drive of a heating or air conditioning system of a motor vehicle, comprising a number of elastic damping elements for damping or decoupling operation-induced (mechanical) vibrations in relation to an outer housing which at least partially surrounds the electric motor or its motor housing. A mounting of an electric motor in this manner is known, for example from DE 197 30 810 A1, from DE 199 42 953 A1 or from DE 100 54 556 A1.

Description of the Background Art

A device for the vibration-decoupled mounting of an electric motor, in particular a fan motor, is known from DE 10 2010 041 177 A1, which corresponds to US 2013/0328421. The decoupled mounting of the electric motor on an outer housing takes place with the aid of at least one decoupling element, which is seated on a radial connecting lug of the motor housing (pole housing). To rule out the risk of a collision between the connecting lug and the outer housing, the decoupling element surrounds the connecting lug on the motor side in the form of a sleeve with a casing part, which is supported, via at least one web, on an outer part surrounding the casing part in the form of a frame. The decoupling element is accommodated in a receptacle of the preferably two-part outer housing via this outer part, which is (azimuthally) closed on the circumferential side.

An electric motor, in particular a fan motor, is known from EP 1 636 892 B1, which corresponds to U.S. Pat. No. 7,566,998, and which comprises a vibration-decoupled mount having dumbbell-like decoupling elements arranged such that they are distributed on the circumference of a pole housing, where they are inserted into slotted holding lugs which form a single piece with the pole housing and which are bent out of the pole housing.

SUMMARY OF THE INVENTION

It is therefore an object of the invention to improve a device of the type mentioned at the outset with regard to its decoupling properties for the purpose of preventing or at least largely avoiding the transmission of operation-induced vibrations and acoustic excitations from the electric motor to its surroundings, in particular to an outer housing surrounding the electric motor. In addition, decoupling- and damping-specific adaptations to different operation-induced vibrational excitations are to be easily facilitated, for example taking into account different resonances as a result of imbalances and/or based on magnetic properties of the electric motor. Another object is to specify a particularly suitable drive comprising an electric motor.

In an exemplary embodiment, a device for the vibration-decoupled mounting of an electric motor, in particular a fan drive of a heating or air conditioning system of a motor vehicle is provided for this purpose, comprising a number of damping and/or decoupling elements arranged on the motor side. These elements suitably interact with a corresponding number of assigned holding or supporting contours in an outer housing which at least partially surrounds the motor or pole housing. The particular damping or decoupling element is preferably situated axially eccentrically in relation to the electric motor, the stator thereof and/or the pole or motor housing thereof. The motor or motor housing mid-plane serving as the reference variable is, in particular, a flange-like connecting area between two housing parts of the pole or motor housing. It may be a middle ring area (magnetic back iron, housing seam) or the quasi equatorial joint between two end shields (A- and B-side end shield of the pole housing of the electric motor) or housing half shells of the motor housing.

The damping element has, for example, material spokes extending in the shape of a star and, between them, material-free groove areas, open on the circumferential side. The particular damping or decoupling element is advantageously situated between the housing mid-plane, which is, in particular, perpendicular to a motor axis, and the contact points of the particular damping or decoupling element on the motor housing, forming contact-free recesses. Radial holding lugs are suitably mounted on or molded from, in particular bent out of, the motor housing in the area of the particular damping or decoupling element.

In an embodiment, the middle housing area (housing or motor mid-plane) is formed between an A-side and a B-side end shield of the electric motor or the pole or motor housing thereof. According to one refinement, the particular damping or decoupling element may have at least one bearing contour, preferably two bearing contours spaced a distance apart, via which the damping or decoupling element abuts the corresponding contact point of the pole or motor housing, the particular bearing contour and contact point being positioned at a distance from the axial mid-plane of the motor. This distance is suitably greater than half the axial housing height, in particular greater than half the axial height of the particular end shield or housing part.

In other words, the particular damping or decoupling element is situated as far away as possible from the housing or motor mid-plane and therefore as close as possible to the particular axial base or cover area of the pole or motor housing. It is advantageous if the particular damping or decoupling element is supported on a local contact point or bearing contour of the motor housing, in particular via a center contour provided between the bearing contours. It is also particularly advantageous if three damping or decoupling elements are provided, which are distributed evenly, in particular equidistantly, at a 120° angle on the circumference of the pole or motor housing.

The device for the vibration-decoupled mounting of an electric motor thus essentially comprises the, in particular elastic, damping elements, which may be plug-mounted on radial lugs on the motor side or only supported thereon, the active contact or support points of the damping elements preferably being provided on both sides of the axial motor center. The active contact points of the damping elements are thus provided outside an axially central tilting plane of the motor, so that operation-induced vibrations of the motor are particularly effectively damped, and an undesirable noise development is reliably suppressed.

The holding contours of an outer housing surrounding the electric motor or its motor housing may be existing contours of the outer housing or those created for this purpose. The outer housing is, in particular, a vehicle body part or fixture of a motor vehicle, for example in the area of a center console or an instrument panel structure of the vehicle, the electric motor being used as an electromotive drive of a fan of a heating or air conditioning system of the vehicle. The motor-side lugs may be mounted on the motor housing thereof, formed from its material by punching or bending or molded onto an intermediate housing part which accommodates the electric motor. An electric motor is understood to be, in particular, a brushless, internal rotor DC motor. For example, the bearing contour abuts a surface of the outer housing which is inclined in the axial direction. In particular, the surface has a kink, and the damping and/or decoupling element is arranged in such a way that the damping and/or coupling element is elastically deformed on the basis of the kink upon an application of force. A damping action is improved in this manner. In particular, the corresponding bearing contour of the damping and/or decoupling element is linear and, in particular, parallel to at least one section of the inclined surface of the outer housing, so that a comparatively large contact surface is created.

The damping or decoupling element advantageously has an axially running slot, in particular on the side facing away from the electric motor. A stabilizing rib is positioned within the slot, which is preferably connected to, for example molded onto, the outer housing.

A form fit, advantageously a clearance fit, is advantageously provided between the slot and the stabilizing rib, which simplifies an assembly. Tangentially acting forces are absorbed via the stabilizing rib, which increases a stability. Alternatively, the stabilizing rib is situated at a distance from the damping or decoupling element in the assembled state, but is preferably situated within the slot. For example, the damping or decoupling element is situated in the axial direction at least partially within an axial guide, which is preferably connected to, for example molded onto, the outer housing, which further increases the stability.

The drive is preferably used to operate a fan of a heating or air conditioning system of a motor vehicle. The drive comprises an electric motor and an outer housing, the electric motor being held on the outer housing, which preferably surrounds the electric motor on the circumferential side, with the aid of a damping and/or decoupling element, also referred to below as a damping element. The damping element abuts the electric motor eccentrically in the axial direction, in particular it abuts a motor housing of the electric motor. The damping element advantageously abuts an area of the transition from an axial area to a radial area of the motor housing, i.e., in particular in the area of an end face but preferably an axially running section of the electric motor.

In particular, the damping element abuts two contact points on the electric motor, the distance between the two contact points in the axial direction being greater than 0.5, 0.75, 0.8, 0.9 of the axial extension of the electric motor or the axial extension of an essentially cylindrical motor housing of the electric motor (housing height). The electronic motor is, for example, a brushless, internal rotor DC motor. The damping element is advantageously made from a rubber.

The motor housing is advantageously formed with the aid of an A-side and a B-side end shield, which are connected to each axially in the center. In particular, the two end shields have a cup-shaped design and abut each other by their end faces, i.e., in the area of an edge contour. In particular, a flange is formed via the edge contour. The two end shields preferably include corresponding joining contours, which engage with each other in a form-fitting manner during assembly.

For example, an electronic system is connected to the outer housing, for example screwed thereto. A stator of the electric motor, which is advantageously arranged within the motor housing, is advantageously energized with the aid of the electronic system. As a result, the electronic system is also decoupled from the electric motor, so that the latter is not burdened by vibrations.

The outer housing advantageously includes a first outer housing half and a second outer housing half, which are preferably connected to each other, for example in a force-fitting manner. The damping element is advantageously supported on both outer housing halves, the two support points being advantageously spaced a distance apart in the axial direction, i.e., in a direction parallel to the motor axis (rotation axis of the electric motor). For assembly, the electric motor is first suitably connected to the first outer housing half with the aid of the damping element and, in another work step, the second outer housing half is connected to the first outer housing half, the damping element being supported on both outer housing halves. The damping element, and consequently also the electric motor, is thus secured in the axial direction with the aid of both outer housing halves.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In brushless electric motors (DC motors), a decoupling system is usually implemented in that decoupling elements, which are also referred to below as damping elements, are fixed on the motor housing in the radial direction with the aid of three metallic ribs. These radial ribs may be formed in that corresponding recesses are created in the outer flange or back iron at the particular exposed points, and the required radial lugs for the damper positions are formed by bending. The particular damping element may then be individually positioned on of these radial lugs in each case. These radial lugs are usually necessary for arranging the system and for a vibration test.

A significant disadvantage of this concept is that the damping elements are pressed on directly in the location of the flange connection or back iron, since this is where the vibration excitation (acceleration) induced by the magnetic or electromagnetic properties and/or effects of the motor is at its maximum. This results in a non-optimized decoupling system.

Moreover, the usual dimensions and designs of the decoupling elements result in fixed positions between the damping element and the housing-side ring section, in which the metallic radial lugs represent the reference points. The latter are known to be situated too close together. Known designs also tend toward asymmetrical decoupling systems, in particular in the axial direction, in relation to the motor axis. Due to these damping or decoupling support points, which are positioned very close together in the area of the mid-plane of the motor or its housing, and, in particular, due to intentionally or unintentionally implemented asymmetries, an operation-induced tilting torque around the axial mid-plane (center plane) of the motor is practically unavoidable, in particular if the motor shaft is oriented horizontally in the assembled state of the electric motor. This also results in unfavorable equilibrium effects and a negative noise behavior, in particular at high motor rotational speeds.

The invention is therefore based on the idea of positioning the damping elements or their active bearing contours (contact points) on the motor housing in locations in which the vibration properties (acceleration effects) induced by the operation (due to electromotive or magnetic effects) are minimal. The distance between the two pressure areas of contact points of the damping element and the motor housing should therefore be increased. This makes the damping system more stable, and the focus area is situated between these two pressure points.

According to an exemplary embodiment, the damping elements should therefore be in contact with the motor housing on its axial upper side (cover side) and axial lower side (base side). These eccentric contact areas are practically not influenced by the magnetic structure of the electric motor and thus minimize acceleration effects. A radial recess (gap) between the particular damping element and the housing outer wall of the motor housing represents a particularly preferred specific embodiment of the damping element. Acceleration effects are thus compensated for by the damping system or are not transmitted to the outer housing, which surrounds and supports the electric motor.

The greatest possible distance between the active contact points of the damping elements on the motor housing must be selected, so that two contact points situated as far apart as possible are formed for the purpose of minimizing possible bending torques.

Holding elements (radial lugs) provided for the damping elements are suitably not provided on a back iron or in the area of a back iron of this type. Instead, provided holding lugs may be produced during the stamping/bending process during the manufacture of the housing half shells of the motor housing by a corresponding stamping/bending step.

Figure 3:
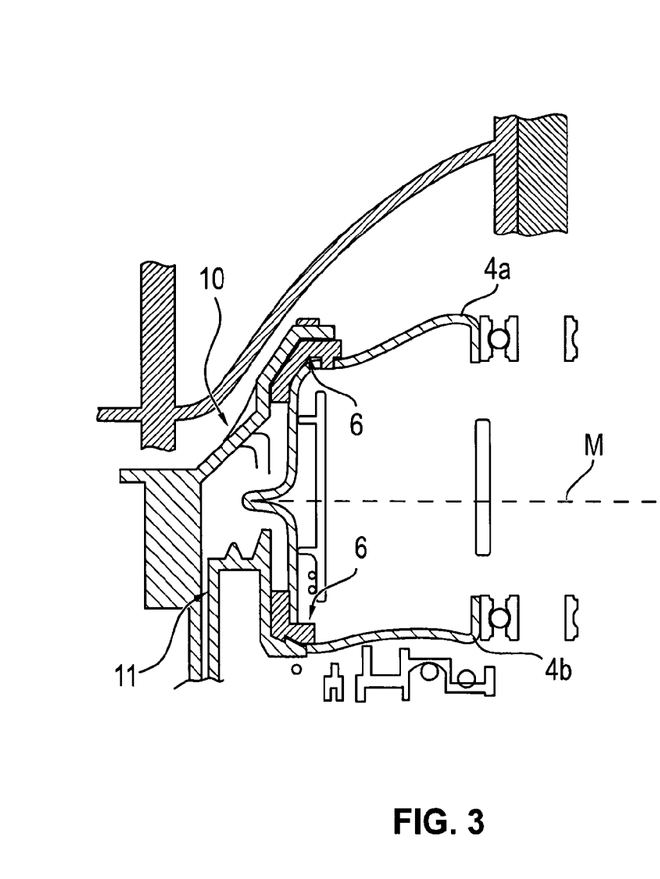
FIG. 3 shows another sectional representation for illustrating active contact points of the or an alternative damping element on the motor mount or on the motor housing.

According to an embodiment according to FIG. 3, the particular damping element may have a quasi two-part design, one part in each case being situated in the corner or edge areas of the motor housing, i.e., in the transitional area between an at least approximately cylindrical lateral outer surface, which extends essentially in the axial direction, and a cover and base area on the end faces, which extend quasi radially, the motor axis being oriented quasi normal thereto. For example, the damping element at least partially surrounds an edge which is formed between the cylindrical lateral outer surface and the cover and base areas on the end faces.

In its assembled position, the damping elements are particularly preferably situated in the area of the axial upper side and the axial lower side, i.e., on the axially diametrically opposed end faces of the stator or the stator magnets which coaxially surround the motor shaft, with the rotor fixed thereto, and are supported in these axial positions on the motor housing. In other words, the contact points or the individual parts of the damping elements are situated on the bending edges between a cover area and the cylindrical lateral surface or between the latter and the base area of the motor housing.

The advantages achieved with the invention include, in particular, in the fact that vibration and/or acceleration effects or excitations are optimally damped by the damping system according to the invention and are thus decoupled from the outer housing surrounding the electric motor. The background thereof is that the essential excitation and vibration components occur only in the radial direction as a result of the magnetic structure and may be optimally absorbed by the damping elements. Acoustic vibrations, harmonics and harmonic waves as well as resonance effects are significantly reduced hereby, so that a particularly advantageous noise behavior of a fan drive of this type is achieved overall.

Figure 1:
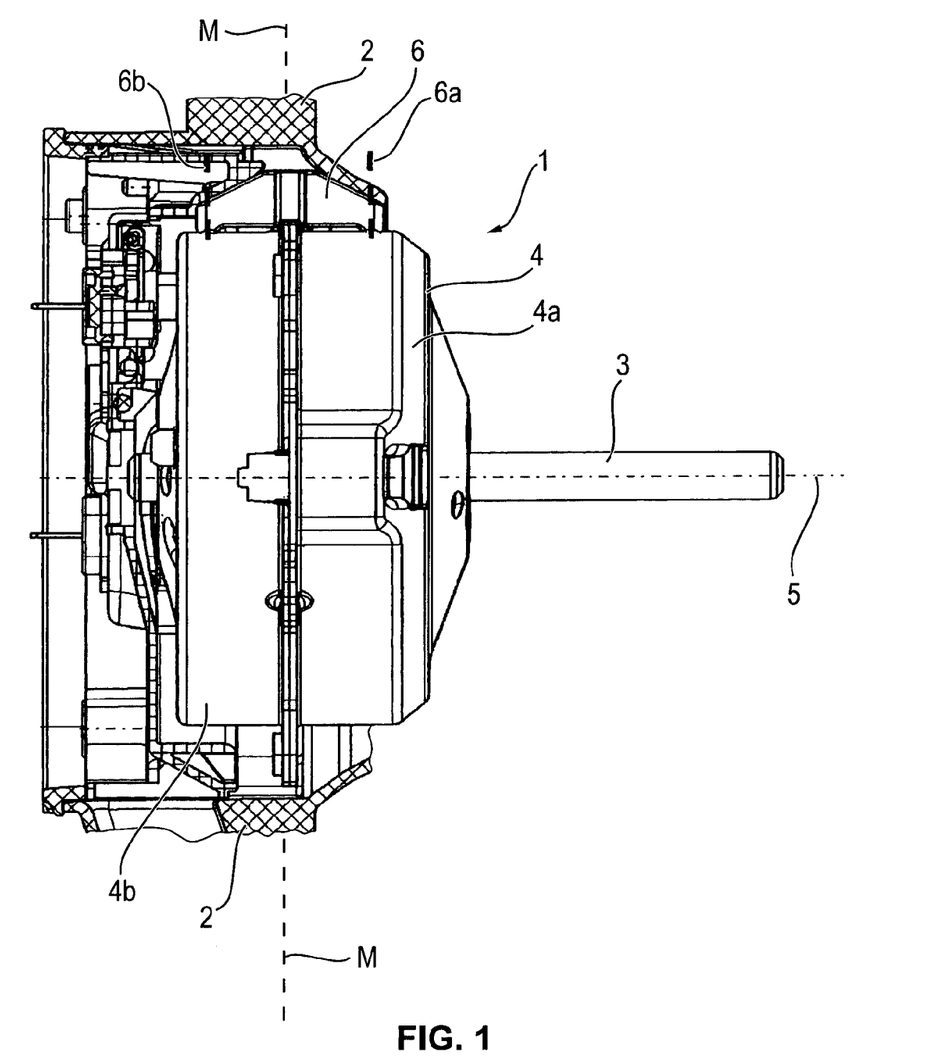
FIG. 1 shows a side view of an electric motor (fan drive motor) mounted in an outer housing, including a eccentrically acting damping element.

FIG. 1 specifically shows a schematic view of an electric motor 1, which is fastened to an outer housing 2 in a vibrationally decoupled manner as a component of a motor vehicle with the aid of a mount or a holding device. On its motor shaft 3, electric motor 1 carries an impeller, which is not illustrated, of a fan drive of a heating or air conditioning system of the vehicle. Electric motor 1 includes a motor housing 4, which coaxially surrounds motor axis 5, and which is assembled in this case from two housing half shells 4a and 4b joined in a mid-plane M, e.g. an A-side and B-side end shield. Outer housing 2 may be a vehicle body part or fixture of the motor vehicle, for example in the area of a center console.

Figure 4:
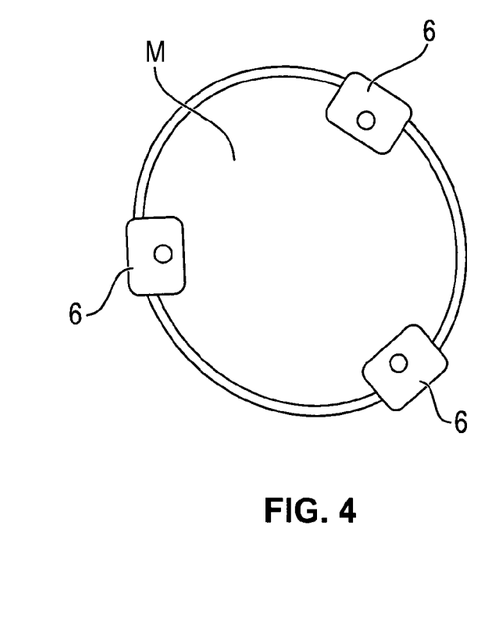
FIG. 4 shows a schematic view of the regular arrangement of three damping elements on the motor circumference.

According to FIG. 4, the mount can include three, in particular elastic, for example rubber elastic, damping elements 6, which are arranged on the circumferential side such that they are distributed equidistantly at a 120° spacing angle on motor housing 4. According to the first variant according to FIGS. 1 and 2, these damping elements are supported eccentrically, or are situated eccentrically, on motor housing 4, each with the aid of two contact points (contact planes).

In the exemplary embodiment, mid-plane M of housing 4 or electric motor 1 is a seam between an A end shield 4a and a B end shield 4b, from which motor housing 4 is assembled. Local radial lugs may be provided here, against which particular damping element 6 is guided by its central area.

Figure 2:
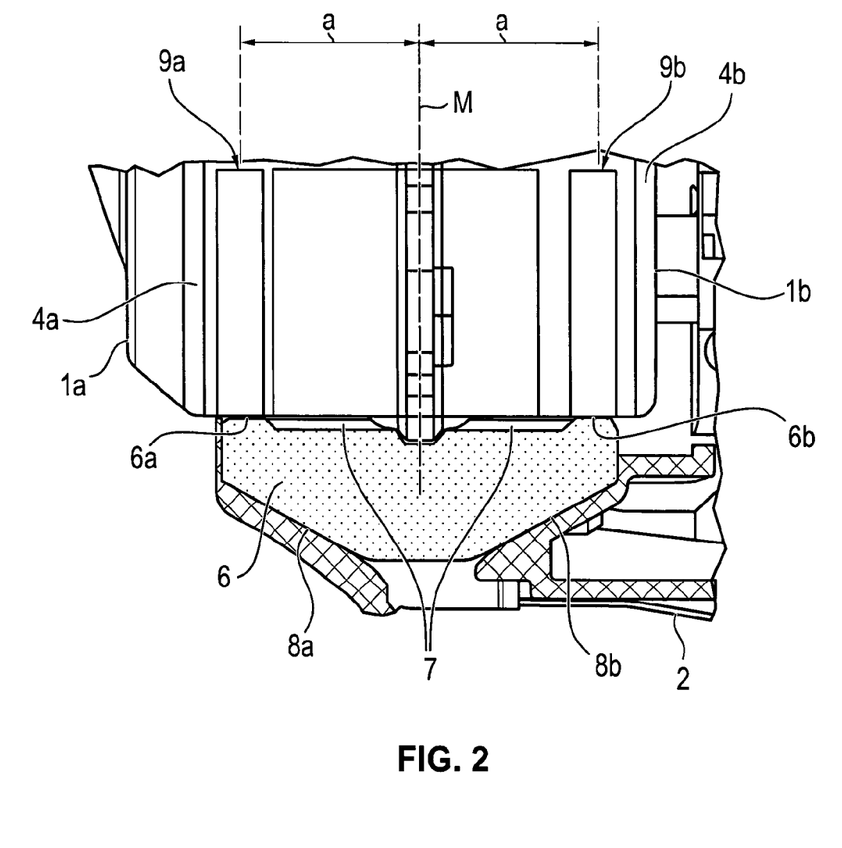
FIG. 2 shows a detail on an enlarged scale of the damping element, including its eccentric contact points, on the motor housing.

As is comparatively clearly apparent from FIG. 2, a recess (gap) 7 in damping element 6 is provided in this center area (mid-plane) M and from there in the direction of particular contact points 6a and 6b. The only local, eccentric contact points 6a, 6b are advantageously provided thereby in a defined manner. It is essential for these contact points 6a, 6b to be positioned at a preferably great axial distance a from mid-plane M of housing 4 in the direction of housing end faces 1a, 1b thereof. In particular, distance a is greater than half the axial extension of the two housing half shells 4a, 4b.

Particular damping element 6 is supported on outer housing 2 by its contact surface facing away from motor housing 4 via bearing contours 8a, 8b.

In FIG. 2, the eccentric contact areas, spaced a distance apart, between damping element 6 and motor housing 4 are identified by arrows 9a and 9b.

The second variant is illustrated in FIG. 3, reference number 4a designating the A-side end shield and reference number 4b designating the B-side end shield in this figure. A motor mount and a contact plate are identified by reference numbers 10 and 11, respectively.

The invention is not limited to the exemplary embodiments described above. Instead, other variants of the invention may be derived therefrom by those skilled in the art without going beyond the subject matter of the invention. Moreover, in particular, all individual features described in connection with the exemplary embodiment may also be otherwise combined with each other without going beyond the subject matter of the invention.

The invention is explained once again on the basis of additional figures, the illustrated elements or their embodiment/properties being transferable, in particular, to the figures described above, and vice versa.

Figure 5:
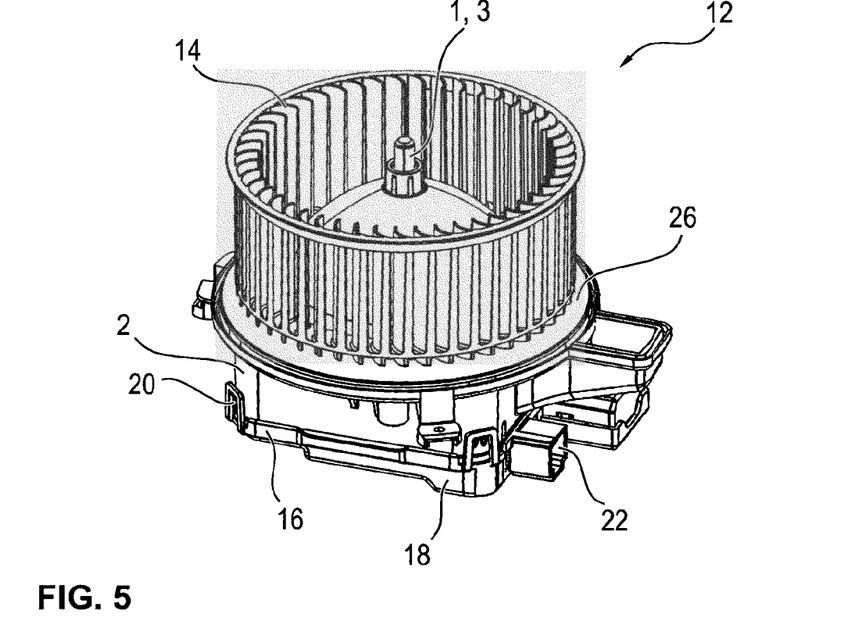
FIG. 5 shows a fan, including a drive.

A fan 12 of a heating or air conditioning system of a motor vehicle is shown in a perspective view in FIG. 5. Fan 12 comprises an impeller 14, which is designed as a radial impeller. Impeller 14 is connected to motor shaft 3 of electric motor 1, which is surrounding by outer housing 2 on the circumferential side. An electronic system 18 having an electronic system compartment cover 16 is furthermore connected to outer housing 2. Electric or electronic components of electronic system 18 are surrounded by electronic system compartment cover 16 and outer housing 2. Electronic system 18 is positioned on the side of outer housing 2 opposite impeller 14. In other words, outer housing 2 is arranged between impeller 14 and electronic system 18. Electronic system compartment cover 16 is held on outer housing 2 with the aid of a clip connection 20. Electronic system 18 also has a terminal 22 for electrical contacting with an electric line or a cable. Outer housing 2, electronic system 18 and electric motor 1 are part of a drive 26 of fan 12.

Figure 6:
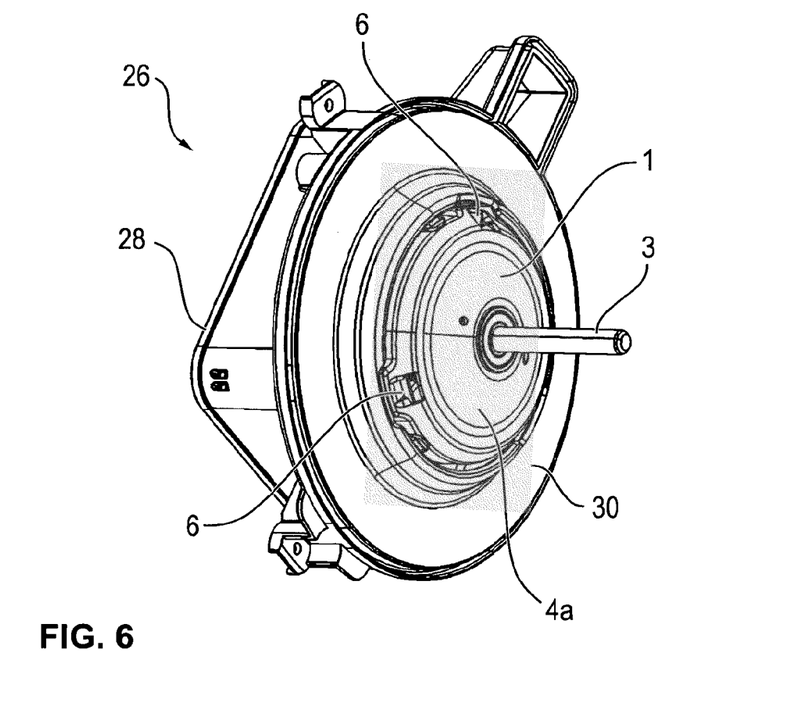
FIG. 6 shows a perspective view of the drive, including the outer housing, which has a first outer housing half and a second outer housing half, and the electric motor.
Figures 7, 8, 9:
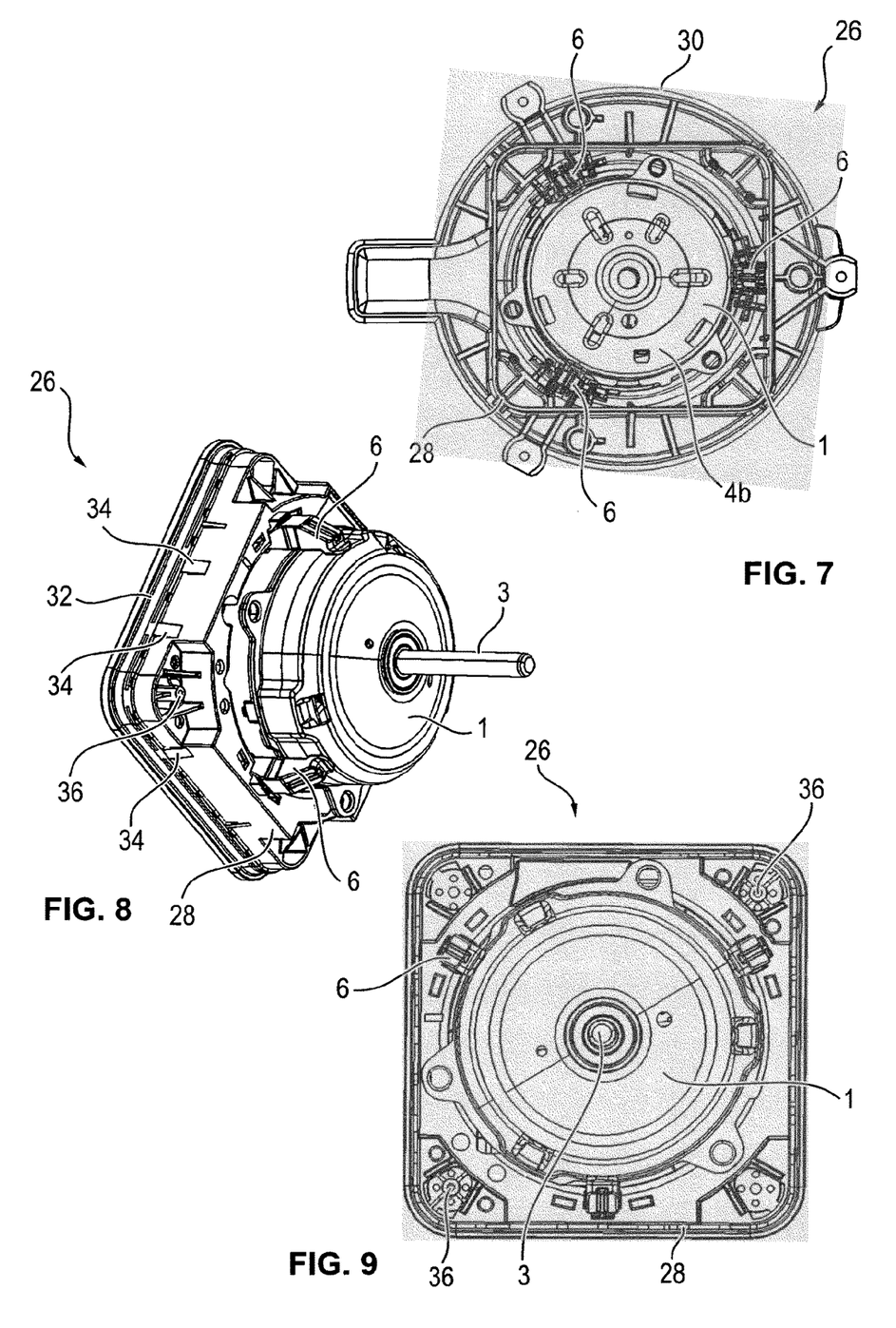
FIG. 7 shows the end face of the drive.
FIG. 8 shows the drive according to FIG. 6 without the second outer housing half.
FIG. 9 shows the drive according to FIG. 7 without the second outer housing half.

FIG. 6 shows a perspective side view of impeller 14 of drive 26, and FIG. 7 shows a top view of one end face of drive 26, electronic system 18 being removed in FIG. 7. Outer housing 2 includes a first outing housing half 28 and a second outer housing half 30, which are made of a plastic and are joined to each other. Outer housing 2 surrounds electric motor 1 in the radial direction, the electric motor being held thereon in a vibration-decoupled manner with the aid of the three damping elements 6.

Drive 26 according to FIGS. 6 and 7 is shown in FIGS. 8 and 9, second outer housing half 30 being removed. First outer housing half 28 has a square base surface, which has an outwardly projecting step for forming a stop 32 on the end side. In other words, the axial end of first outer housing half 28 is thickened in a radially projecting manner. Upstream in the axial direction, first outer housing half 28 includes a number of ramp-shaped webs 34, with the aid of which stop 32 is stabilized, on the one hand. On the other hand, these webs make it easier to push second housing half 30 onto first housing half 28, during the mounting of the former, until the latter abuts stop 32. Second outer housing half 30 is widened elastically on the end side, so that first and second outer housing halves 28, 30 are connected to each other in a force-fitting manner. The pushing of second outer housing half 30 onto first outer housing half 28 is limited with the aid of stop 32. Moreover, the two outer housing halves 28, 30 may be screwed into corresponding bores 36 with the aid of screws, which are not illustrated in greater detail here. The three damping elements 6 are held on first outer housing half 28.

Figure 10A:
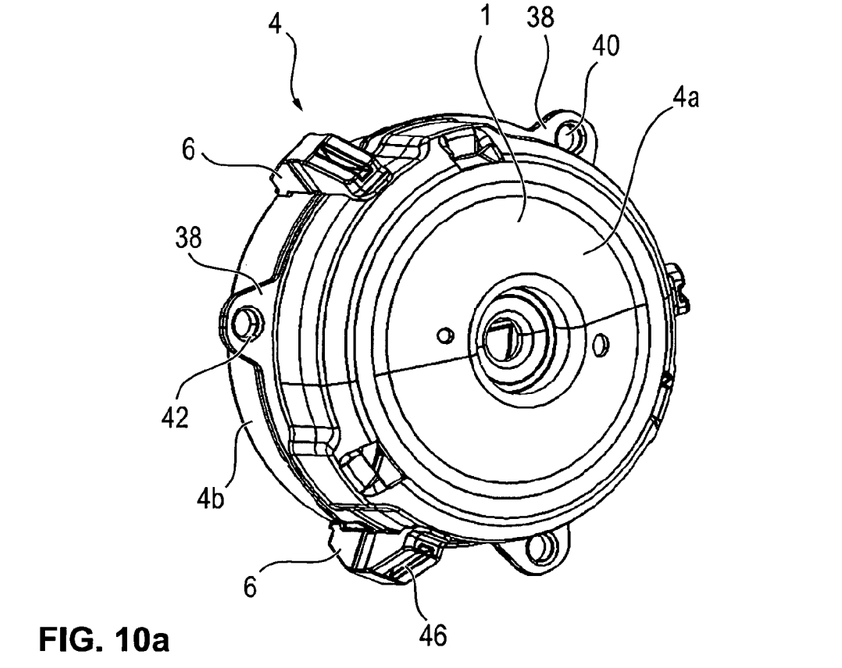
FIG. 10a shows a perspective view of the electric motor.
Figure 10B:
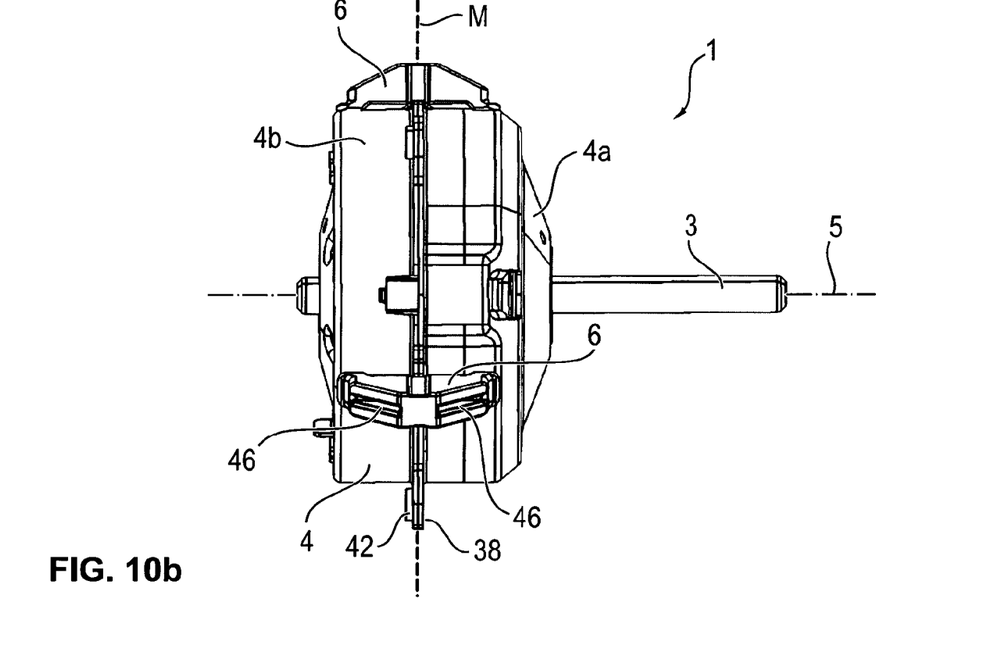
FIG. 10b shows a side view of the electric motor.

In FIGS. 10a and 10b, electric motor 1 is shown in a partial perspective view and in a side view, respectively. Electric motor 1 includes A-side end shield 4a and B-side end shield 4b, which are fastened to each other in the manner of a flange connection for the purpose of creating motor housing 4. The two end shields 4a, 4b include radially projecting lugs 38 for this purpose, which cover each other. Motor housing 4 includes three assembled lugs 38 of this type, which are distributed rotation-symmetrically with respect to motor axis 5. Consequently, a 120° angle is formed between lugs 38. Lugs 38 of the B-side end shield each have a recess 40, within which an axially running, hollow cylindrical tab 42 of A-side end shield 4a is inserted, establishing a form and force fit.

Mid-plane M is thus formed on the flange-like joint created in this manner of the two cup-shaped end shields 4a, 4b. A radially running extension 44 (FIG. 16) is molded onto the two end shields 4a, 4b in the area of the joint, corresponding extensions 44 of the two end shields 4a, 4b covering each other in the axial direction. Motor housing 4 includes three assembled extensions 44 of this type, which are distributed rotation-symmetrically with respect to motor axis 5. Consequently, a 120° angle is formed between individual extensions 44. One of damping elements 6 is mounted on each of these extensions 44, and they are oriented in the axial direction, i.e. in parallel to motor axis 5. Each of damping elements 6 has two axially running slots 46, the two axially running slots 46 of each damping element 6 being spaced a distance apart in the axial direction (FIG. 17). Motor shaft 3 furthermore projects out of motor housing 4 on the side of A-side end shield 4a.

Figure 11:
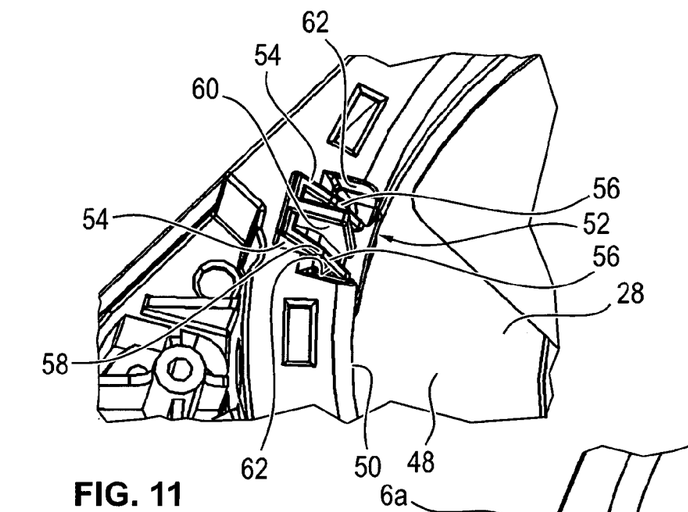
FIG. 11 shows a detail of the first outer housing half.

A detail of first outer housing half 28 is illustrated in FIG. 11, which has an essentially cup-shaped or hollow cylindrical recess 48, within which electric motor 1 is positioned in the assembled state. Walls 50 of cup-shaped recess 48 are situated radially at a distance from electric motor 1. First outer housing half 28 has a first axial guide 52, including two radially and axially running webs 54 which are situated a distance apart in the tangential direction. Webs 54 each have a surface 56 on the side facing electric motor 1 in the assembled state. Surface 56 has a kink 58, so that each surface 56 is essentially in the shape of a V. In each case, the end of surface 56 closer to A-side end shield 4a in the assembled state is situated at a farther radial distance to motor axis 5.

An essentially triangular stabilizing rib 60 is molded onto additional components of first outer housing half 28 between the two webs 54, the edges of stabilizing rib 60 running in the axial or radial direction. The two webs 54 are positioned between two radially outwardly oriented guide surfaces 62 of first axial guide 52, which consequently tangentially surround both webs 54 as well as stabilizing rib 60. Webs 54 and stabilizing rib 60 are offset radially to the outside, compared to wall 50, into which a recess is introduced via guide surfaces 62. First housing half 28 includes three first axial guides 52 of this type, which are positioned relative to each other by a 120° angle and to each of which one of damping elements 6 is assigned.

Figure 12:
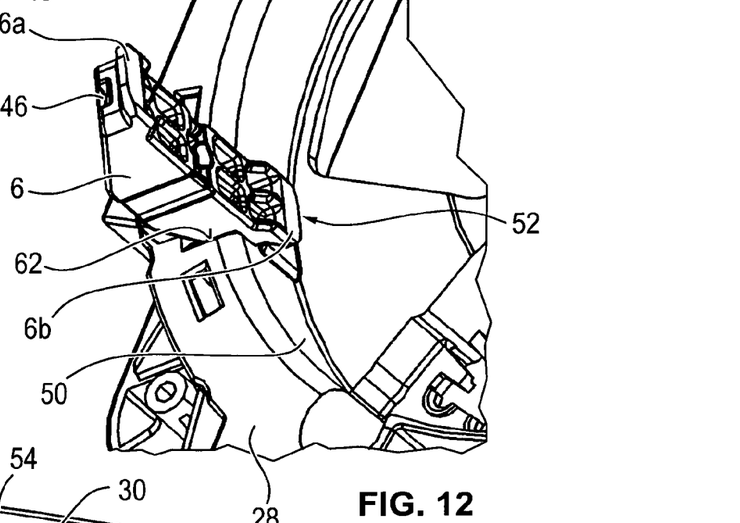
FIG. 12 shows a detail of the first outer housing half, including the attached damping element.

FIG. 12 shows one of damping elements 6, which is positioned in one of first axial guides 52, a clearance fit, in particular, being formed between guide surfaces 62 and damping element 6. Stabilizing rib 60 is arranged within one of slots 46 of damping element 6 illustrated here, a clearance fit likewise being created. Stabilizing rib 60 is situated beneath the clearance fit or within slot 46 at a distance from damping element 6 and is used to correctly position the damping element during assembly. Stabilizing element 60 abuts the two surfaces 56 via its bearing contour 8b. Consequently, damping element 6 is supported on the two webs 54, which form a holding or supporting contour. Due to kink 58, only the radially inner area of surfaces 56 are in contact with damping element 6, i.e. in the axial direction up to kink 58, in the unloaded state. Second contact point 6b is situated at a distance from wall 50, due to the design of axial guide 52.

Figure 13:
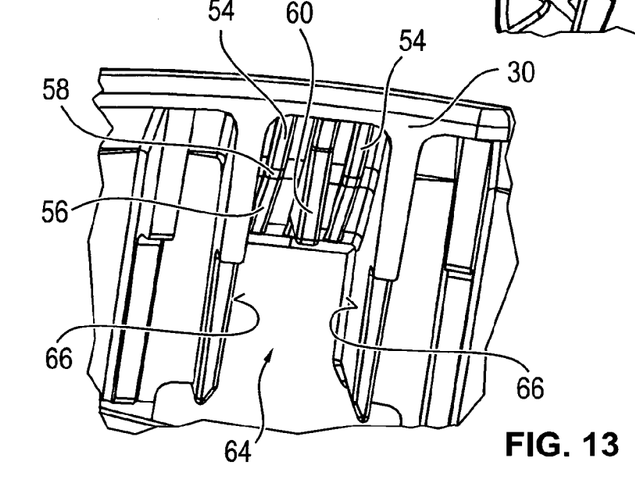
FIGS. 13 and 14 show details of the second outer housing half.
Figure 14:
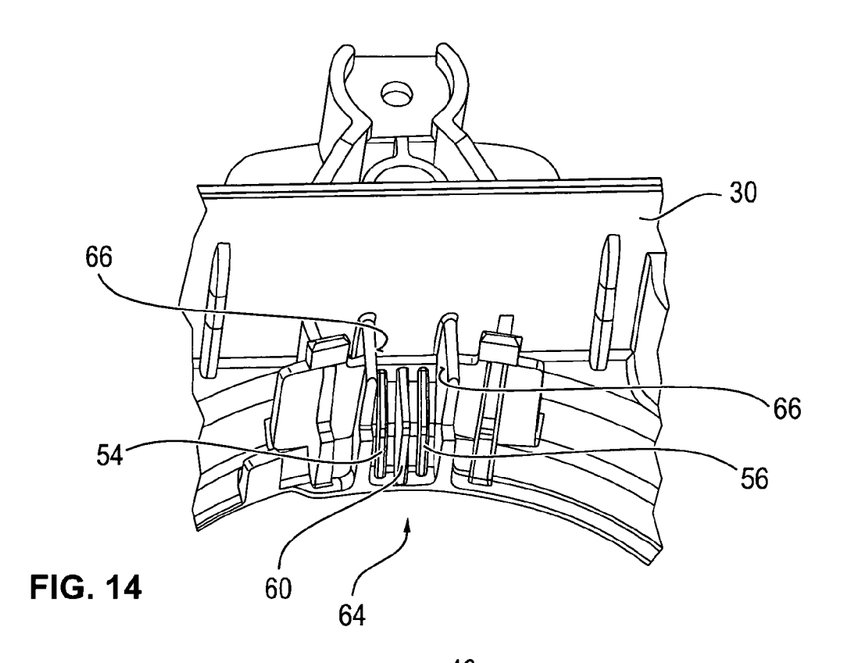

FIG. 13 shows a detail of second outer housing half 30, and FIG. 14 also shows second outer housing half 30, but from a different perspective. Second housing half 30 includes three second axial guides 64, which are positioned relative to each other by a 120° angle with respect to motor axis 5 and to each of which one of damping elements 6 is assigned. One of second axial guides 64 is illustrated in FIGS. 13 and 14, which includes two radially outwardly guided guide surfaces 66, which run essentially in the axial and radial directions. The two guide surfaces 66 are situated a distance apart, and a stabilizing rib 60 as well as webs 54, which tangentially surround stabilizing rib 60, are positioned therebetween. Stabilizing rib 60 and webs 54 are of the same type as the component of first outer housing half 28. Stabilizing rib 60 is thus positioned between the two webs 54, which have radially inwardly facing surfaces 56 with kink 58. However, the end of surface 56 facing B-side end shield 4b in the assembled state is situated at a greater radial distance from motor axis 5. As a result, every second axial guide 64 is essentially constructed as a mirror image of one of first axial guides 52 with respect to mid-plane M, however guide surfaces 66, in particular having an enlarged design.

Figure 15:
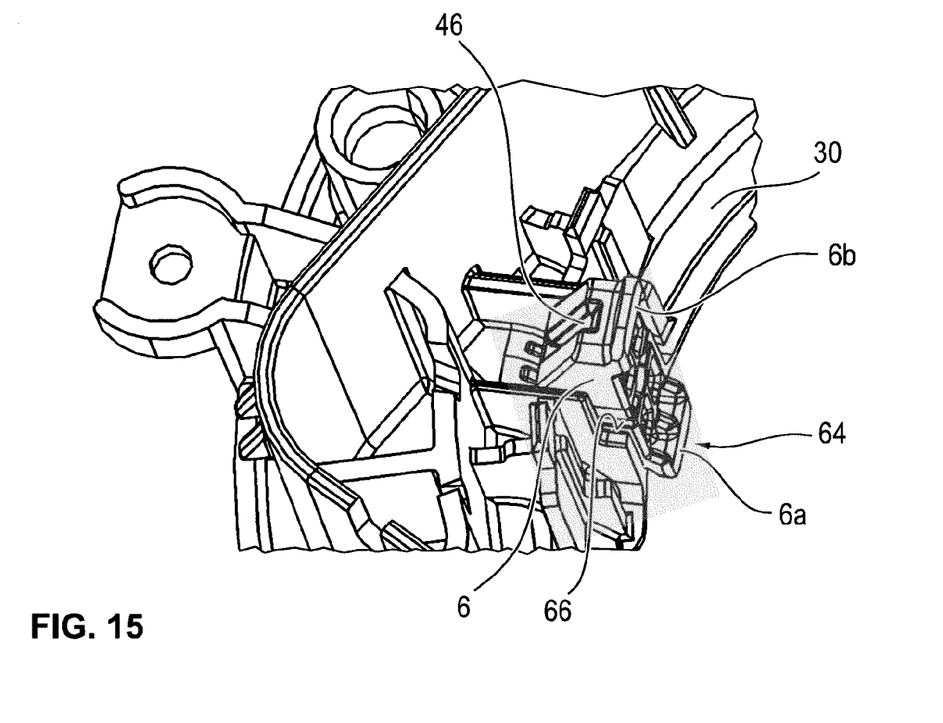
FIG. 15 shows a detail of the second outer housing half, including the attached damping element.

FIG. 15 shows damping element 6 positioned in second axial guide 64. In this case, guide surfaces 66 tangentially abut damping element 6, which is also supported on surfaces 56, which likewise form a holding or supporting structure, thus forming a clearance fit. Stabilizing rib 60 is situated in the other of the two slots 46. Due to second axial guide 64, first contact point 6a is offset radially inwardly with respect to second outer housing half 30, so that electric motor 1 is also situated at a radial distance from second outer housing half 30 in the assembled state.

Figure 16:
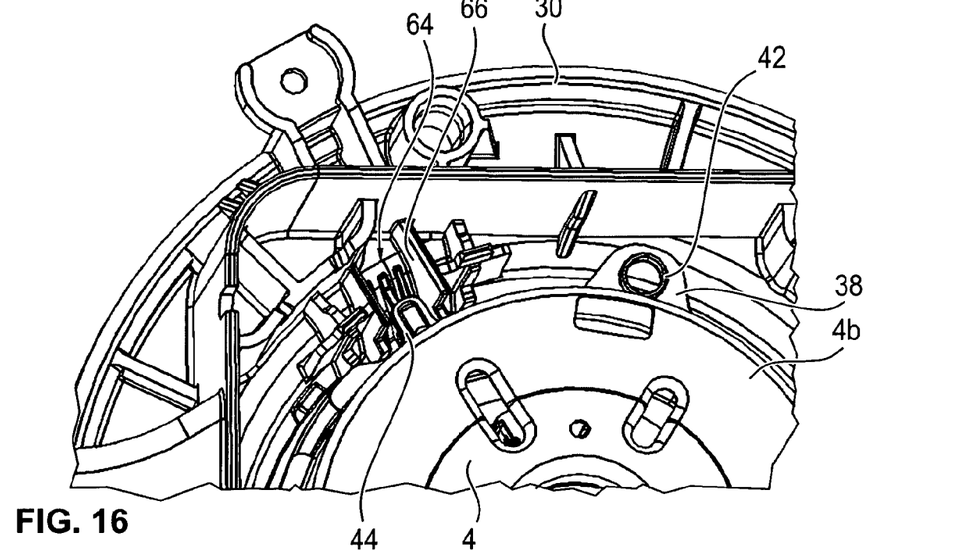
FIG. 16 shows a detail of the electric motor positioned within the second outer housing half.
Figure 17:
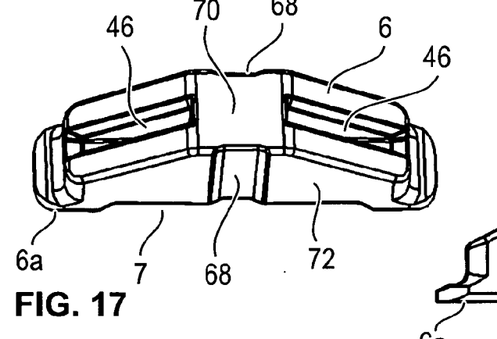
FIG. 17 shows a perspective view of the damping element.

FIG. 16 shows motor housing 4 positioned within second outer housing half 30. In this case, one of extensions 44, which is situated at a distance from the two guide surfaces 66, is positioned within each axial guide 64, i.e. tangentially between the two guide surfaces 66 of second axial guide 64. If first outer housing half 28 is also present, extension 44 is also positioned within first axial guide 52 as well as between guide surfaces 62, which, however, are not illustrated here. In the assembled state, each extension 44 is surrounded by one of damping elements 6, which are not illustrated here, and is situated in this manner at a distance from outer housing 2.

Figure 18:
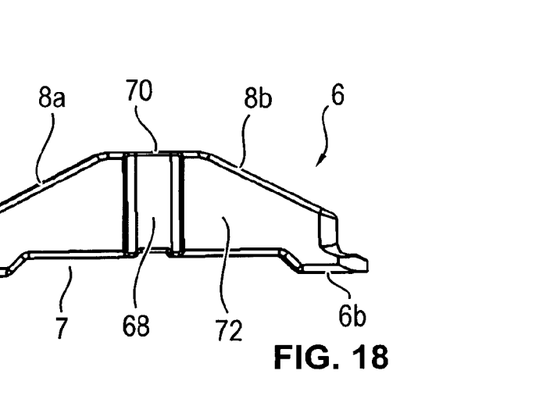
FIG. 18 shows a side view of the damping element.
Figure 19:
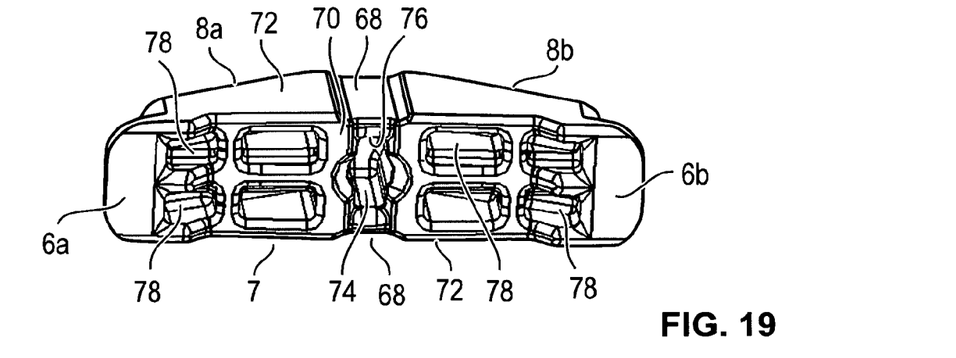
FIG. 19 shows a perspective view of the damping element.

FIG. 17 illustrates a perspective view of one of the three structurally identical damping elements 6, shown radially from the outside, FIG. 18 illustrates a side view thereof, and FIG. 19 illustrates a perspective view thereof, but shown radially from the inside. Damping element 6 is manufactured from a rubber, in particular from an elastic rubber. The rubber is, for example, a thermoset.

Damping element 6 has an essentially triangular cross section in the axial direction, which is formed with the aid of axially running recess 7 as well as axially and radially running bearing contours 8a, 8b. The two radially inwardly projecting contact points 6a, 6b are positioned in the area of the axial ends.

Between the two bearing contours 8a, 8b, which are essentially linear, damping element 6 is provided with a tapered design by means of second radially running grooves 68, which are introduced into a central piece 70 on both sides. As a result, the two side walls 72 of damping element 6, which are arranged in the tangential direction, are partially recessed by means of grooves 68. Each of bearing contours 8a, 8b has triangular slot 46 running in the axial direction. The edges of each slot 46 thus run essentially in the axial or radial direction. The two slots 46 are separated from each other by central piece 70.

Central piece 70 furthermore has a radial recess 74 on the side facing electric motor 1 in the assembled state, essentially in the middle of central piece 70, which is limited on by sides in the tangential direction by one contact area 76. One of extensions 44 in each case is at least partially positioned within recess 74, which resembles a blind hole, in the assembled state, preferably establishing a form fit. In particular, a press fit is established between radial recess 74 and particular extension 44.

Damping element 6 furthermore has a number of damping recesses 78, for example two, four, six, ten, twelve or, as in this case, eight, which are formed by means of radially running recesses resembling blind holes, which end in the area of recess 7, i.e. on the side of damping element 6 facing electric motor 1. A flexibility of damping element 6 is increased by damping recesses 78, and a damping effect is consequently improved.

For assembly, the two end shields 4a, 4b are first joined together, which take place by inserting tab 42 into recesses 40. However, other methods of fastening the two end shields are also conceivable. In another work step, the three damping elements 6 are mounted on extensions 44 of motor housing 4 by means of their radial recesses 74, where they are fixed with the aid of a force fit/press fit. After mounting each damping element 6, the latter abuts motor housing 4 by means of the particular two contact points 6a, 6b, each of the two contact points 6a, 6b being assigned to one of the two end shields 4a, 4b. The latter are situated at a distance from extension 44 in the axial direction and are located in an area of an axial end of particular end shield 4a, 4b.

In another work step, motor housing 4, including damping elements 6 connected thereto, are set into first outer housing half 28, each of damping elements 6 being inserted into one of first axial guides 52. Particular stabilizing rib 60 is inserted into particular assigned slot 46, and second bearing contour 8b is supported on particular webs 54. Side wall 72 of particular damping elements 6 is also supported in the tangential direction by means of side walls 62. However, damping elements 6 are positioned, in particular, only loosely within particular first axial guide 52.

In another work step, second outer housing half 30 is pushed onto first outer housing half 28, each of damping elements 6 being positioned in one of second axial guides 64. In this case as well, particular stabilizing rib 60 of particular second axial guide 64 is arranged within particular slot 46, and damping element 6 is supported in each case via webs 54, in particular via surface 56, and a tangential movement of the damping element is prevented with the aid of guide surfaces 62. A force-fitting connection of the two outer housing halves 28, 30 to each other is implemented with the aid of webs 34 and stop 32. Due to radially running grooves 68, each extension 44 is connected in a non-force-fitting manner to one of the two outer housing halves 28, 30 in the tangential direction. In one alternative, electric motor 1, two which damping elements 6 are fastened, is first inserted into second outer housing half 30, and in another work step, first outer housing half 28 is fastened to second outer housing half 30.

Upon a vibration of electric motor 1 in relation to outer housing 2, i.e. a movement of electric motor 1 in relation to outer housing 2, this movement is absorbed by damping elements 6. If a force is applied to damping element 6 outwardly in the radial direction, the latter is elastically deformed, the area of the contact between particular bearing contour 8a, 8b and assigned surface 54 being enlarged due to particular kink 58, which results in an elastic deformation of particular damping element 6. As a result, a support is increased, and a greater force is therefore necessary to continue moving electric motor 1 with respect to outer housing 2. In other words, the damping action is, in particular, progressive.

Due to grooves 68, a tangential movement of electric motor 1 with respect to outer housing 2, i.e. a rotational movement around motor axis 5 is first absorbed by means of elastic deformation of damping elements 6, so that a movement of this type is also not introduced into outer housing 2. As a result, particular damping element 6 is always first elastically deformed before an application of force onto outer housing 2 takes place.

The invention is not limited to the exemplary embodiment described above. Instead, other variants of the invention may be derived therefrom by those skilled in the art without going beyond the subject matter of the invention. Moreover, in particular, all individual features described in connection with the exemplary embodiment may also be otherwise combined with each other without going beyond the subject of the invention. Moreover, individual elements may be omitted or be provided with a different design as well as replaced with other elements. In particular, an axially eccentric contact of the damping element on the electric motor is currently deemed to be essential to the invention, advantageously in an axial end area, preferably in both axial end areas.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for vibration-decoupled mounting of an electric motor, in particular a fan drive of a heating or air conditioning system of a motor vehicle, the device comprising:
   a plurality of damping and/or decoupling elements arranged on a motor side, at least one of the plurality of damping or decoupling elements being supported eccentrically in relation to the electric motor, a stator of the electric motor, a pole housing of the electric motor, or a motor housing of the electric motor in an axial direction,
   wherein the at least one of the plurality of damping or decoupling elements comprises:
      an axially running slot configured to receive a stabilizing rib of the electric motor in a form-fitting manner; and
      a plurality of radially running recess holes on a surface of the at least one of the plurality of damping or decoupling elements,
      wherein the axially running slot is on a first surface which is opposite from the surface in which the plurality of radially running recess holes is located, and
   wherein the plurality of radially running recess holes extend in a radial direction at lateral sides of the axial running slot toward the first surface without extending through the first surface.

2. The device according to claim 1, wherein the at least one of the plurality of damping or decoupling elements is configured to abut the motor housing of the electric motor forming a contact-free recess between contact points of the at least one of the plurality of damping or decoupling elements.

3. The device according to claim 2, wherein the contact points of the at least one of the plurality of damping or decoupling elements are provided on both sides of an axial center of the electric motor.

4. The device according to claim 1, wherein radial holding lugs are mounted on or molded from the pole housing or the motor housing of the electric motor in an area of the at least one of the plurality of damping or decoupling elements, and/or wherein a housing connection is formed between an A-side end shield and a B-side end shield of the electric motor or the pole housing or the motor housing of the electric motor, and wherein the at least one of the plurality of damping or decoupling elements is configured to be positioned in an area of the housing connection.

5. The device according to claim 1, wherein the at least one of the plurality of damping or decoupling elements has at least one bearing contour, two bearing contours, or contact points arranged a distance apart, via which the at least one of the plurality of damping or decoupling elements is configured to abut the corresponding contact point of the pole housing or the motor housing of the electric motor, and
   wherein the at least one bearing contour and the corresponding contact point are positioned at a first distance from the axial mid-plane of the electric motor.

6. The device according to claim 5, wherein the distance is greater than half an axial housing height of a housing section or joined housing part or greater than half an axial height of an end shield.

7. The device according to claim 1, wherein the at least one of the plurality of damping or decoupling elements is supported on a local contact point, bearing contours, or a radial holding lug with the aid of a center contour provided between the bearing contours, and/or wherein three damping or decoupling elements are provided and arranged equidistantly at a 120° angle such that the three damping or decoupling elements are configured to be distributed on a circumference of the pole housing or the motor housing of the electric motor.

8. The device according to claim 1, wherein the at least one of the plurality of damping or decoupling elements is situated at least partially within an axial guide in the axial direction.

9. A drive of a fan of a heating or air conditioning system of a motor vehicle, the drive comprising an outer housing, which includes the device according to claim 1.

10. The drive according to claim 9, wherein an electronic system is connected to the outer housing.

11. The drive according to claim 10, wherein the outer housing comprises a first outer housing half and a second outer housing half, and
wherein the first and second outer housing halves are supported on the at least one of the plurality of damping or decoupling elements.

12. The drive according to claim 11, wherein the outer housing further comprises a plurality of ramp-shaped webs.

13. The device according to claim 1, wherein the at least one of the plurality of damping or decoupling elements further comprises material spokes extending in a shape of a star.

14. The device according to claim 13, wherein the at least one of the plurality of damping or decoupling elements further comprises material-free groove areas between the material spokes.

15. The device according to claim 1, wherein the axially running slot is disposed between the two sloped surfaces.

16. An electric motor, comprising:
a housing;
a stabilizing rib, formed on the housing; and
a damping or decoupling element of the electric motor supported eccentrically to the electric motor in an axial direction, the damping or decoupling element comprising:
an axially running slot, within which the stabilizing rib is arranged in a form-fitting manner; and
a plurality of radially running recess holes on a surface of the damping or decoupling element,
wherein the axially running slot is on a first surface which is opposite from the surface in which the plurality of radially running recess holes is located, and
wherein the plurality of radially running recess holes extend in a radial direction at lateral sides of the axial running slot toward the first surface without extending through the first surface.

\* \* \* \* \*